US009278876B2

(12) United States Patent
Ye et al.

(10) Patent No.: US 9,278,876 B2
(45) Date of Patent: Mar. 8, 2016

(54) TREATMENT OF WASTE PRODUCT (75) Inventors: Zhengfang Ye, Haidian District Beijing (CN); Zhongyou Wang, Haidian District Beijing (CN); Mohe Zhang, Haidian District Beijing (CN)

(73) Assignee: Peking University (CN)

( * ) Notice: Subject to any disclaimer, the term of this patent is extended or adjusted under 35 U.S.C. 154(b) by 580 days.

(21) Appl. No.: 13/322,335

(22) PCT Filed: Oct. 27, 2010

(86) PCT No.: PCT/CN2010/078166
§ 371 (c)(1),
(2), (4) Date: Apr. 11, 2012

(87) PCT Pub. No.: WO2012/055101
PCT Pub. Date: May 3, 2012

(65) Prior Publication Data
US 2012/0273412 A1 Nov. 1, 2012

(51) Int. Cl.
*C02F 3/06* (2006.01)
*C02F 1/66* (2006.01)
(Continued)

(52) U.S. Cl.
CPC ............... *C02F 3/341* (2013.01); *C02F 3/005* (2013.01); *C02F 3/06* (2013.01); *C02F 3/30* (2013.01); *C02F 1/461* (2013.01); *C02F 1/66* (2013.01); *C02F 2101/003* (2013.01);
(Continued)

(58) Field of Classification Search
CPC ............ C02F 3/341; C02F 3/005; C02F 3/06; C02F 3/30; C02F 1/66; C02F 2101/003; C02F 2101/345; C02F 2103/36; C02F 2203/002; C02F 2209/005; C02F 2209/006; C02F 2209/008; C02F 1/461
USPC ......... 210/150, 151, 605, 608, 615, 616, 617, 210/903, 909, 723, 724, 748.01
See application file for complete search history.

(56) References Cited

U.S. PATENT DOCUMENTS 6,051,130 A * 4/2000 Perriello .................... 210/150
6,066,772 A 5/2000 Hater
(Continued)

FOREIGN PATENT DOCUMENTS

CN 1132725 A 10/1996
CN 1152551 A 6/1997
(Continued)

OTHER PUBLICATIONS

Lee, B. and Lee, M., Decomposition of 2,4,6-Trinitrotoluene (TNT) by Gamma Radiation, Environ. Sci. Technol., 2005, 9278-85, 39.
(Continued)

*Primary Examiner* — Fred Prince
(74) *Attorney, Agent, or Firm* — Moritt Hock & Hamroff LLP; Steven S. Rubin, Esq.

(57) ABSTRACT

Technologies are generally described for a treatment system and a method for treating waste product. In some examples, the treatment system may include a container effective to receive a waste product. The treatment system may further include one or more filters in communication with the container. The filter or filters may include a polymer carrier material. The polymer carrier material may include at least one of *Sphingomonas* bacteria, *Flavobacteriales* bacteria or *Chryseobacterium* bacteria.

17 Claims, 4 Drawing Sheets

(51) Int. Cl.
*C02F 1/461* (2006.01)
*C02F 3/34* (2006.01)
*C02F 3/00* (2006.01)
*C02F 3/30* (2006.01)
C02F 101/00 (2006.01)
C02F 101/34 (2006.01)
C02F 103/36 (2006.01)

(52) U.S. Cl.
CPC ...... *C02F 2101/345* (2013.01); *C02F 2103/36* (2013.01); *C02F 2203/002* (2013.01); *C02F 2209/005* (2013.01); *C02F 2209/006* (2013.01); *C02F 2209/008* (2013.01); *Y02W 10/12* (2015.05); *Y02W 10/15* (2015.05)

(56) References Cited

U.S. PATENT DOCUMENTS

| | | | | |
|---|---|---|---|---|
| 2001/0004063 | A1* | 6/2001 | Oh | 210/748 |
| 2007/0060477 | A1* | 3/2007 | Pedersen et al. | 504/100 |
| 2009/0017524 | A1* | 1/2009 | Bianchi et al. | 435/252.5 |

FOREIGN PATENT DOCUMENTS

| | | |
|---|---|---|
| CN | 1266820 A | 9/2000 |
| CN | 1793311 A | 6/2006 |
| CN | 1907888 A | 2/2007 |
| CN | 1986440 A | 6/2007 |
| CN | 101054241 A | 10/2007 |
| CN | 101148293 A | 3/2008 |
| CN | 101148307 A | 3/2008 |
| CN | 101279808 A | 10/2008 |
| CN | 101830606 A | 9/2010 |
| CN | 101973606 A | 2/2011 |
| CN | 101830606 A | 5/2012 |
| JP | 04-061993 | 2/1992 |
| JP | 04-229174 | 8/1992 |
| JP | 06-039394 | 2/1994 |
| JP | 09-135682 | 5/1997 |
| JP | 10-165983 | 6/1998 |
| JP | 10-244294 | 9/1998 |
| JP | 2003-024050 | 1/2003 |
| JP | 2004-159599 | 6/2004 |
| JP | 2004-344736 | 12/2004 |
| JP | 2005-034692 | 2/2005 |
| JP | 2006-166874 | 6/2006 |
| JP | 2007-000831 | 1/2007 |
| JP | 2007-007575 | 1/2007 |
| JP | 2007-535398 A | 12/2007 |
| JP | 2008-272540 | 11/2008 |
| JP | 2010-42363 A | 2/2010 |
| WO | 2006/129132 A1 | 7/2006 |
| WO | 2008/018486 A1 | 2/2008 |

OTHER PUBLICATIONS

Lee, KB., Gu MB., Moon, SH., Degradation of 2,4,6-Trinitrotoluene by Immobilized Horseradish peroxidase and Electrogenerated Peroxide, Water Res, 2003, 983-92, 37.
Prak, DJ., Solubilization of Nitrotoluenes in Micellar Nonionic Surfactant Solutions, Chemosphere, 2007, 1961-7, 68.
Adrian, NR., Arnett, CM., Anaerobic Biotransformation of Explosives in Aquifier Slurries Amended with Ethanol and Propylene Glycol, Chemosphere, 2007, 1849-56, 66.
Liou, MJ., Lu, MC., Chen, JN., Oxidation of Explosives by Fenton and Photo-Fenton Processes, Water Res, 2003, 3172-9, 37.
Marcio, BR., Silva, FT., Paiva, TC., Combined Zero-Valent Iron and Fenton Processes for the Treatment of Brazilian TNT Industry Wastewater, J. Hazard Mater, 2009, 1224-8, 165.
Liou, MC., Lu, MC., Chen, JN., Oxidation of TNT by Photo-Fenton Process, chemosphere, 2004, 1107-14, 57.
An FQ, Gao, BJ., Feng, FQ. Adsorption Performance and Mechanism of 2,4,6- Trinitrotoluene on a Novel Adsorption Material Polyvinylbenzl Acid/SIO2, Appl. Surf. Sci., 2009, 5031-5, 255.
I. Malollari, Treatment of the "Red Water" and Solid Disposal Waste from Albanian Explosive Manufacture, Journal of Environmental Protection and Ecology, 2000, 44-50, 1.
Boopathy, R. et al., Metabolism of 2,4,6- Trinitrotoluene by a Pseudomonas Consortium, Under Aerobic Conditions, Curr. Microbiol, 1994, 131-7, 28.
Lewis, TA. et al., Bioremediation of Soils Contaminated with Explosives, J. Environ. Manage., 2004, 291-307, 70.
Park, CH., Kim, SY., Optimization for Biodegradation of TNT by Pseudomonas Putida, J. Biosci. Bioeng., 2003, 567-71, 95.
Claus, H. et al., Transformation of 2,4,6-trinitrotoluene (TNT) by Raoultella terrigena, Biodegradation, 2007, 27-35, 18.
Bayman, P. and Radkar, G.V., Transformation and tolerance of TNT by Fungi, International Biodeterioration and Biodegradation, 1996, 45-53, 39.
Haidour, AJ. and Ramos, L., Identification of Products Resulting from the Biological Reduction of 2,4,6-trinitrotoluene, 2,4-Dinitrotoluene and 2,6-dinitritoluene by Pseudomonas sp, Environ. Sci. Technol., 1996, 2365-2370, 30.
International Search Report and Written Opinion for application with No. PCT/US2010/078166 dated Aug. 11, 2011,15 pages.
Zhengfang, Y. et al., "Pilot-Scale Test on Nitrotoluene Wastewater Treatment with Micro-Electrolysis and I-BAF", Environmental Engineering, Aug. 2008, p. 73-75 & 5, vol. 26, No. 4.

* cited by examiner

300 A computer program product.
302 A signal bearing medium.

304

At least one of:
One or more instructions for a method for treating waste product; or
One or more instructions for receiving the waste product;
One or more instructions for filtering the waste product with a filter, wherein the filter includes at least one polymer carrier material, wherein the polymer carrier material includes at least one of Sphingomonas bacteria, Flavobacte

FIG. 4

TREATMENT OF WASTE PRODUCT

CROSS-REFERENCE TO RELATED APPLICATION

This present application is a U.S. national phase application under 35 U.S.C. §371 of International application No. PCT/CN2010/078166, filed on Oct. 27, 2010, the entirety of this application is incorporated herein by reference.

BACKGROUND

Unless otherwise indicated in the subject disclosure, the materials described in this section do not represent prior art to the claims in this application and cannot be admitted to be prior art by inclusion in this section.

Waste product can result from many sources. Such waste product can cause pollution if improperly disposed. To deal with the issue of pollution, waste product may be treated. In treating waste, it may be sometimes desirable to remove certain component(s) in the waste product.

SUMMARY

In one example, a treatment system is generally described. The treatment system may include a container effective to receive a waste product. The treatment system may further include a filter in communication with the container. The filter may include a polymer carrier material. The polymer carrier material may include at least one of *Sphingomonas* bacteria, *Flavobacteriales* bacteria or *Chryseobacterium* bacteria.

In one example, a method for treating waste product is generally described. The method may include receiving the waste product. The method may further include filtering the waste product with a filter. The filter may include at least one polymer carrier material. The polymer carrier material may include at least one of *Sphingomonas* bacteria, *Flavobacteriales* bacteria and *Chryseobacterium* bacteria.

In one example, a treatment system is generally described. In some examples, the treatment system includes a container, a first filter and a second filter. The container may be effective to receive a waste product. The first filter may be in communication with the container. The first filter may be effective to receive the waste product from the container and produce filtered waste product. The first filter may include a first bacteria in a first polymer carrier material. The first bacteria may be at least one of *Sphingomonas* bacteria, *Flavobacteriales* bacteria and *Chryseobacterium* bacteria. The second filter may be in communication with the first filter. The second filter may be effective to receive the filtered waste product from the first filter. The second filter may include a second bacteria in a second polymer carrier material. The second bacteria may be one of *Sphingomonas* bacteria, *Flavobacteriales* bacteria and *Chryseobacterium* bacteria. The first bacteria may be distinct from the second bacteria.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and, therefore, should not be considered limiting of its scope, the disclosure will be described with additional specificity and detail through use of the accompanying drawings, in which:

DETAILED DESCRIPTION

In the following detailed description, reference may be made to the accompanying drawings, which form a part hereof. In the drawings, similar symbols typically identify similar components, unless context dictates otherwise. The illustrative embodiments described in the detailed description, drawings, and claims should not be understood to be limiting. Other embodiments may be utilized, and other changes may be made, without departing from the spirit or scope of the subject matter presented herein. It will be readily understood that the aspects of the present disclosure, as generally described in the subject disclosure, and illustrated in the Figs., can be arranged, substituted, combined, separated, and designed in a wide variety of different configurations, all of which may be explicitly contemplated in the subject disclosure.

This disclosure is generally drawn generally drawn, inter alia, to methods, apparatus, systems, devices, and computer program products related to treating waste product.

Briefly stated, technologies are generally described for a treatment system and a method for treating waste product. In some examples, the treatment system may include a container effective to receive a waste product. The treatment system may further include one or more fillers in communication with the container. The filter or filters may include a polymer carrier material. The polymer carrier material may include at least one of *Sphingomonas* bacteria, *Flavobacteriales* bacteria or *Chryseobacterium* bacteria.

Figure 1:
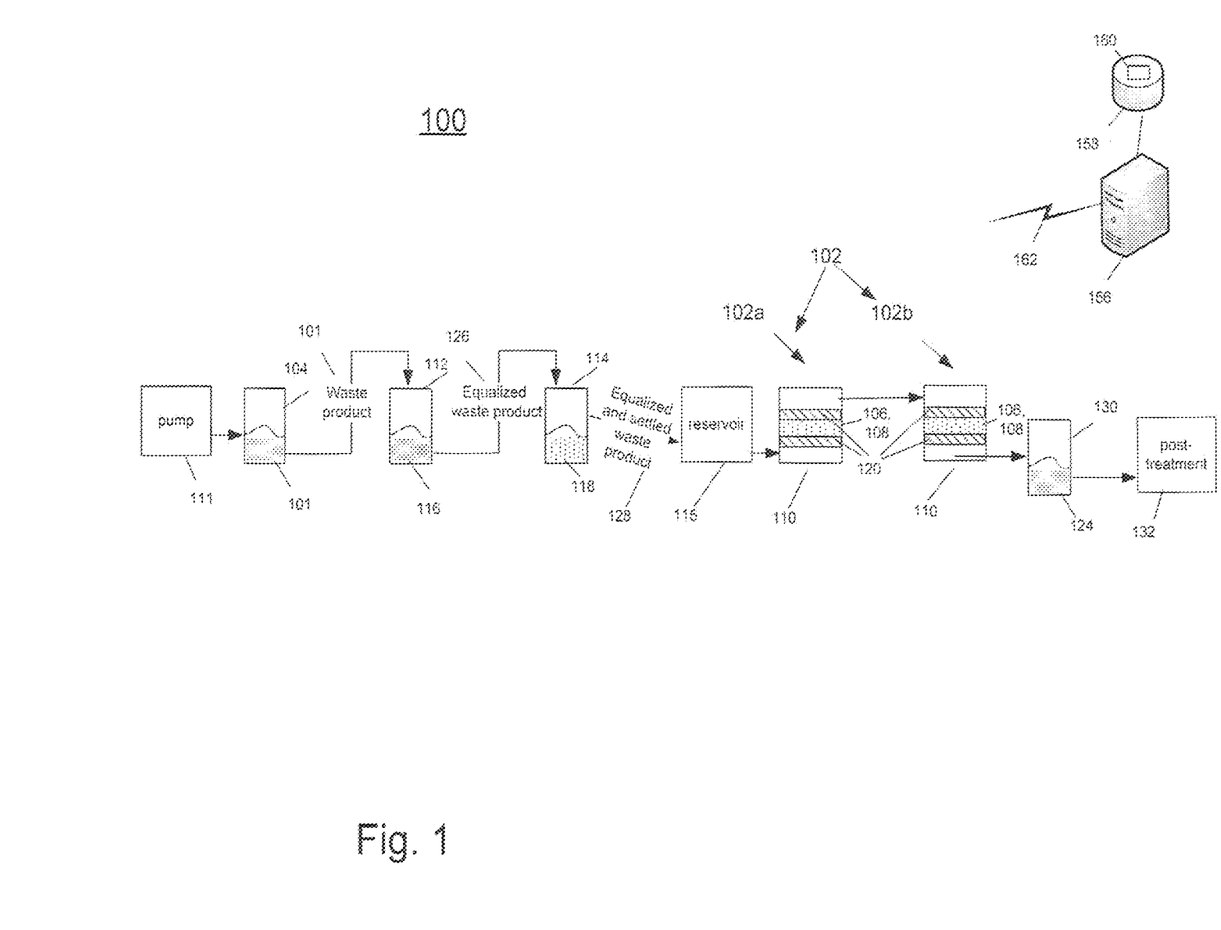
FIG. 1 illustrates an example of a treatment system.

FIG. 1 illustrates an example of a treatment system 100 that may be arranged in accordance with at least some embodiments presented herein. As described in more detail below, treatment system 100 may include a container 104, a pump 111, an equalization tank 112, a settlement tank 114, a regulating reservoir 115, and/or one or more filter(s) 102 which may include a first filter 102a in communication with a second filter 102b. In some examples, container 104 may be effective to receive a waste product 101. At least some of these elements may be arranged in communication with a processor 156 through a communication link 162. In some examples, processor 156 may be adapted to be in communication with a memory 158 that includes instructions 160 stored therein. Processor 156 may be configured, such as by instructions 160, to control at least some of the operations described below. Pump 111 may be effective to feed waste product 101 from container 104 through equalization tank 112, settlement tank 114 and to filter(s) 102.

As discussed in more detail below, treatment system 100 may be effective to receive and treat waste product 101 and produce filtered wasted product 124 in container 130. Container 104 may be one or more of a holding vessel or storage tank of one or more sizes effective to receive a desired amount of waste product 101. Filtered waste product 124 may be further processed in a cell or tank 132 such as through oxidation-micro-electrolysis, coagulation, and/or sedimentation, etc.

Some examples of waste product 101 may be undesirable components and/or byproducts of organic processes. Some specific organic processes can be an industrial process, a chemical reaction process and/or a commercial chemical reaction process. Some examples of a chemical reaction process and/or commercial chemical reaction processes may include the treatment of organic wastewater obtained from the production of trinitrotoluene (TNT).

Some examples of waste product 101 may include TNT and its anaerobic metabolites. Some anaerobic metabolites of TNT may include nitrobenzene(s) and phenylamine(s). Some examples of anaerobic metabolites of TNT include ammonia, nitrogen, aniline, hexanoic acid and heptanoic acid. Some examples of organic waste product obtained from the production of TNT may include TNT decompression water, red water containing TNT, 2,4 dinitro-toluene (DNT) and, 2-nitrotoluene (MNT), etc.

In some examples, waste product 101 may have a concentration of TNT of from about 1 mg/L to about 200 mg/L, specifically from about 5 mg/L to about 150 mg/L and more specifically from about 10 mg/L to about 120 mg/L.

One example of treatment system 100 may include one or more filter(s) 102 in communication with container 104. Some examples of filter(s) 102 may include a mechanical and/or a biological filter. Filter(s) 102 may be in communication with container 104 by any structure used in connecting components and may include tubing, piping, pipelines, fluid connectors, passages, conduits, or the like. Some examples of filter(s) 102 may include a polymer carrier material 108 including an immobilized microorganism 106 in a housing 110. Polymer carrier material 108 may be encapsulated by a mesh material 120 to provide for fixation of the polymer carrier material 108 in housing 110. Some examples of mesh material 120 may be fiberglass mesh or the like.

Equalization tank 112 may be effective to receive and adjust a pH of waste product 101 to a pH of from about 6 to about 9 to produce equalized waste product 126. Settlement tank 114 may be effective to receive equalized waste product 126, and remove suspended substances to produce equalized and settled waste product 128. In some examples, equalized waste product 126 may remain in settlement tank 114 for a predetermined length of lime, such as by way of example about two hours. Some examples of treatment system 100 may have equalization tank 112 and settlement tank 114 employed in any order with respect to the feeding of waste product 101.

In some examples, equalization tank 112 may include a chemical solution 116 such as a chemical buffer. Some examples of chemical solution 116 may be a basic solution. One example of a basic solution may be a sodium hydroxide solution. Some examples of a sodium hydroxide solution may be such as one sufficient to achieve the above described adjustment of pH. Some examples of chemical solution 116 may be a 10% sodium hydroxide solution. In one example of treatment system 100, equalization tank 112 may also provide for mass and volume equalization. Equalization tank 112 may include a mixer and/or an aerator. Mass and volume equalization may help ensure that concentration of influent mix well in the equalization tank. Equalization may help avoid undesired impact on biological filters 102.

In some examples, waste product 101 may be kept in equalization tank 112 for a period of from about 6 hours to about 24 hours, at a temperature of from about 18 degrees Celsius to about 35 degrees Celsius to produce equalized waste product 126.

In some examples, settlement tank 114 may be effective to separate suspended substances 118 from equalized waste product 126. Some examples of suspended substances 118 may include inorganic dust or the like. Equalization tank 112 and/or settlement tank 114 may be effective to protect filter(s) 102 from exposure to undesired pH values, such as below 6 or above 9, and/or exposure to suspended substances that may impair or damage filter(s) 102.

In one example of treatment system 100, chemical solution 116 may be present in equalization tank 112 prior to feeding of waste product 101 from container 104 to equalization tank 112. In one example of treatment system 100, chemical solution 116 may be fed into equalization tank 112 after feeding waste product 101 from container 104 to equalization tank 112. In one example of treatment system 100, waste product 101 may be fed from container 104 to equalization tank 112 simultaneously with chemical solution 116. Regulating reservoir 115 may be used to regulate a quantity of equalized and settled waste product 128.

Some examples of a housing 110 may include a holding device such as the examples of a tank or reactor. Some examples of a microorganism may include a bacteria and/or a fungus 106. Filter(s) 102 may include an immobilized microorganism, may be an immobilized microorganism anaerobic filter(s) (I-AF) or an immobilized microorganism biological aerated filter(s) (I-BAF).

Some examples of treatment system 100 may include an I-AF filter as filter(s) 102 that may have a hydraulic retention time (HRT) of from about 10 hours to about 20 hours. Some examples of treatment system 100 may include an I-BAF filter as filter(s) 102 that may have an HRT of from about 10 hours to about 20 hours. HRT may be determined by the equation: (volume of filter 102)/(flow rate of waste product 101 into filter 102).

Some examples of a volume of a I-AF filter or an I-BAF filter include about 50 m$^3$ to about 150 m$^3$. Some examples of flow rate of a I-AF or I-BAF filter include about 2 to about 8 m$^3$/m$^2$d.

Some examples of treatment system 100 may include an I-AF filter as filter(s) 102 that may demonstrate a contact time of from about 7 to about 12 hours. One example of contact time may be determined by the equation: (polymer carrier material 108 volume)/(flow rate of waste product 101 into filter 102). In some examples of treatment system 100, the HRT and contact time for an I-BAF filter such as filter(s) 102 can be the same as the HRT time and contact time described above for an I-AF filter. Some examples of volume of polymer carrier material 108 may be from about 30 m$^3$ to about 90 m$^3$.

Some examples of treatment system 100 may include an I-AF filter as filter(s) 102 that may be used to filter nitrobenzene(s) and/or other oxidative substances. In some examples of treatment system 100, filter(s) 102 may include an I-BAF filter that may be used to remove phenylamine(s) and other organic substances. Some other examples of organic substances may be hexanoic acid and heptanoic.

Some examples of polymer carrier material 108 may include polyurethane carriers, such as for example, polyurethane foam carriers. Polymer carrier material 108 may include polyester carriers or the like. Some examples of bacteria and/or fungus 106 may include at least one of *Sphingomonas* bacteria, such as for example *Sphingomonas* sp. bacteria, *Flavobacteriales* bacteria such as for example *Flavobacteriales* sp. bacteria, or *Chryseobacterium* bacteria, such as for example *Chryseobacterium* sp. bacteria. Some examples of bacteria and/or fungus 106 may include *Pseudomonas* sp. bacteria, *Pseudomonas putida* sp. Bacteria, and *Raoultella terrigena* sp. bacteria. One example of bacteria and/or fungus 106 includes *Fungi* sp. In some examples, the bacteria may be fed with air to domesticate the bacteria.

In some examples, treatment system 100 may be operated such that waste product 101 may be fed from container 104 to filter 102a or filter 102b in the manner indicated by the arrows in FIG. 1. For example, equalized and settled waste product 128 may be fed through fillers using a gravitational pull and/or using pump 111. In some examples, equalized and settled waste product 128 may be fed into filter(s) 102 at a location below polymer carrier material 108. In an example of treatment system 100, first filter 102a may include an I-AF filter that includes *Pseudomonas* sp. and *Sphingomonas* sp. in polymer carrier material 108, and second filter 102b may include an I-BAF filter that includes *Flavobacteriales* sp. and *Chryseobacterium* sp. in polymer carrier material 108. In some examples, feeding waste product 128 into filter(s) 102 may result in a lower level of components and/or byproducts of organic processes in filtered waste product 124 than in waste product 101. One example of a desirable amount of bacteria and/or fungus 106 in first filter 102a and/or second filler 1021) may include from about 10 g/L to about 40 g/L.

Some examples of the levels of organic process components and/or byproducts in waste product 101 may include the examples of TNT and TNT byproduct or reaction components for making TNT. In one example, some level of TNT, TNT byproduct or reaction components for making TNT may be present in filtered waste product 124 after being filtered by filter(s) 102. Some examples of filtered waste product 124 may have a level of chemical oxygen demand (COD) of from about 1 mg/L to about 400 mg/L. One example of COD of filtered waste product 124 may be from about 5 mgL/to about 350 mg/L.

First filter 102a may be distinct or different from second filter 102b. Second filter 102b may in one example include a second bacteria and/or fungus 106 in polymer carrier material 108 that may be the same or different as the bacteria and/or fungus 106 in filter 102a. Some examples of second filter 102b may include the same or different polymer carrier material 108 as polymer carrier material 108 of first filter 102a.

In some examples, treatment system 100 may include more than one first filter 102a and/or more than one second filter 102b connected in series as shown where the output of one filter feeds into the input of another filter. In some examples, treatment system 100 may include more than one first filter 102a and/or more than one second filter 102b connected in parallel, where an output of one filter is not fed into the input of another filter. In one example, three I-AF first filters 102a may be connected in series to form a three level filler. In one example, five I-BAF second filters 102b may be connected in series to form a five level filter. Some examples of treatment system 100 may include an I-AF filter 102a and/or an I-BAF filter 102b that may be operated at a temperature of from about 15° C. to about 40° C.

In some examples, bacteria and/or fungus 106 may be acclimated to waste product 101 by exposing bacteria and/or fungus 106 to waste product 101 for acclimation period such as about 15 to about 30 days and/or by feeding bacteria and/or fungus 106 with a phosphate.

Among other possible benefits, a system in accordance with the disclosure may improve toxin immunity of microorganisms thereby achieving an efficient biological removal of TNT and other nitrobenzene substances. Toxic side effects of TNT and other nitrobenzene contaminants of microorganisms may be avoided. Microbial acclimation may be relatively short and a system in accordance with the disclosure may be able to start relatively rapidly. TNT and other pollutants may be degraded by immobilized microorganisms so that processing costs may be reduced. Secondary pollution caused by transfer of other physiochemical pollutants may be avoided.

Figure 2:
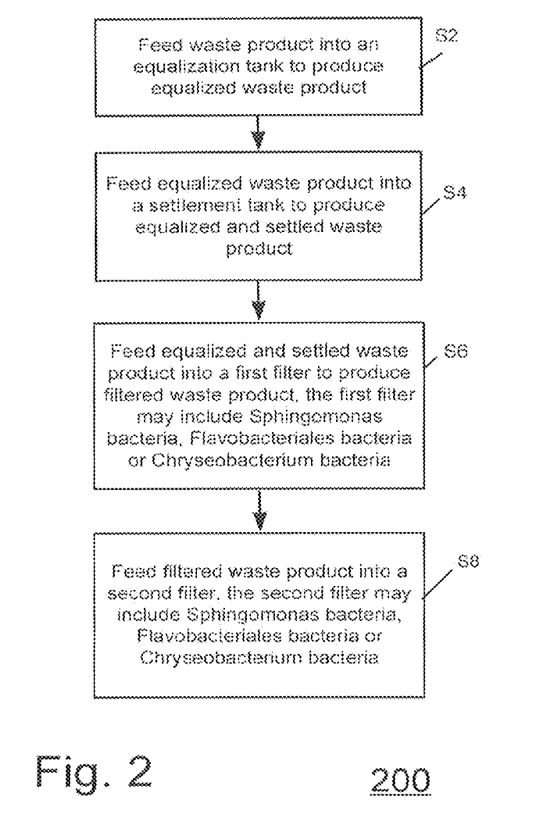
FIG. 2 depicts a flow diagram for an example process for treating a waste product.

FIG. 2 depicts a flow diagram for an example process 200 for treating a waste product in accordance with at least some embodiments described herein. The process in FIG. 2 could be implemented using, for example, system 100 discussed above. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation. Processing may begin at block S2.

At block S2, the system may be configured to feed waste product into an equalization tank to produce equalized waste product. Processing may continue from block S2 to block S4.

At block S4, the system may be configured to feed the equalized waste product into a settlement tank to produce equalized and settled waste product. Processing may continue from block S4 to block S6.

At block S6, the system may be configured to feed the equalized and settled waste product into a first filter to produce filtered waste product. In some examples, the first filter may include *Sphingomonas* bacteria, *Flavobacteriales* bacteria or *Chryseobacterium* bacteria. Processing may continue from block S6 to block S8.

At block S8, the system may be configured to feed the filtered waste product into a second filter. In some examples, the second filter may include *Sphingomonas* bacteria, *Flavobacteriales* bacteria or *Chryseobacterium* bacteria.

In an example, waste product or wastewater treatment may include: physicochemical pre-treatment and biochemical treatment. The physicochemical pre-treatment may include four procedures such as: a three-stage micro-electrolysis, equalization, sedimentation, and use of a regulating reservoir. The biochemical treatment may include a three-stage immobilized microorganisms biological filter I-AF and a five-stage immobilized microorganisms biological filter I-BAF.

In the micro-electrolysis procedure, a treatment system may convert nitro compounds in wastewater into aniline compounds, and improve the biodegradability and pH value of wastewater. The micro-electrolysis may be performed with devices, such as container 104, of a three-stage series, where the devices in each stage may have an effective reaction volume of 0.55 m³. The wastewater may be raised by pumping, such as by pump 111, or using the existing wastewater drainage of a factory to feed into the micro-electrolysis devices.

In the equalization procedure, a treatment system may adjust pH value of the wastewater to convert ferric ions and ferrous ions generated during the micro-electrolysis procedure into ferric hydroxide and ferrous hydroxide for precipitation in settlement tank 118. The main apparatus of this equalization procedure may be an equalization tank 112 such as an alkali adding device. The tank may ensure that equalized waste product 126 feeding out of the equalization tank has a pH value greater than 7. A bottom of equalization tank may be provided with an aerated conduit to help make the wastewater intensively mixed for a full reaction.

In the sedimentation procedure, a sedimentation treatment may be performed on the equalized waste product 126. The resulting equalized and settled waste product may be entered into catchment regulating reservoir 115. The catchment regulating reservoir may be used to regulate wastewater quality and quantity and may add a phosphate to the equalized and settled waste water to ensure biological treatment and stability.

In the bio-chemical treatment, equalized and settled wastewater may be fed from the catchment regulating reservoir 115 to an I-BAF filter 102. In the I-BAF bio-chemical treatment procedure, four-stage biochemical treatment filters 102 may be used. Each filter 102 at each stage may have an average volume of about 1.8 m$^3$ where a lower part may be used for an inlet while a higher part may be used as an outlet. The filters may have a carrier with a volume of about 60% and also may have an aerating system at a bottom of filter 102. In the aerating system, air may enter through a bottom of the filter and microorganisms may be added into filter 102.

In the example, in pre-treatment, wastewater was pumped into a container and wastewater was adjusted to a pH of 7-9 with 10% sodium hydroxide. The equalized wastewater was fed into a sedimentation tank. The resulting supernatant was fed into a regulating reservoir where trisodium phosphate was added. The wastewater in the regulating reservoir was fed successively from a three-stage I-AF to a five-stage I-BAF. After the I-BAF was filled with water, aeration was started and microorganisms, such as *Sphingomonas* bacteria, *Flavobacteriales* bacteria and *Chryseobacterium* bacteria were added in proportion. After three days, pollutant indicators of each filter were monitored, and then the wastewater inflow was controlled at about 0.25 m$^3$/h, a pH value of each filter was maintained at about 6-9, and the temperature was about 18-35° C. A period of microbial culture, acclimation, and immobilization was about 15 to about 30 days.

In this example, a summary of test results of relevant indicators was:

| (Unit: mg/L) | | | |
| --- | --- | --- | --- |
| | Untreated Water | After Pretreatment | Water after Biological treatment |
| MNT + DNT | 65.02 | 12.66 | 0 |
| TNT | 2.07 | 0 | 0 |
| Phenyl amines | 0.16 | 11.13 | 1.48 |
| COD | 164.3 | 177.7 | 58.8 |

In an example, a waste product or wastewater treatment process for mononitrate alkaline red water may include: pre-treatment, biochemical treatment, and/or post-treatment. The pretreatment procedure may include acidification of mononitrate alkaline red water, micro-electrolysis, coagulation, and sedimentation. The pretreated TNT acidic wastewater, and TNT vacuum concentrated water may be mixed, adjusted for equalization, and filled with nutrients. The biochemical treatment may include a three-stage immobilized microorganisms biological filter I-AF and/or a five-stage immobilized microorganisms biological filter I-BAF. The post-treatment may be used as a check and may include oxidation-micro-electrolysis, coagulation, and sedimentation.

In the example, in the pre-treatment procedure, mononitrate alkaline red water was pumped into a regulating settlement tank. Settled mononitrate alkaline red water was pumped into an acidification tank at a flow rate of 50 L/h. Recovered concentrated sulfuric acid produced by a factory that produced the wastewater was added into the acidification tank for acidification. The resulting supernatant after acidification was fed into a micro-electrolysis cell. The micro-electrolysis was adapted to use an upper water inlet and lower water inlet. Resulting water after micro-electrolysis was fed into a coagulation-reaction tank. A base of NaOH was added into the coagulation-reaction tank. A 0.3% PAM (polyacrylamide) solution was added into the coagulation-reaction tank with an amount of about 0.2 L per ton of water. Aeration was used at a bottom of the coagulation-reaction tank. Water yielding from the coagulation-reaction tank was fed into a sedimentation tank. Settled wastewater was fed into a regulating reservoir. The resultant pretreated mononitrate alkaline red water was pumped into a regulating equalization tank to be mixed with TNT acidic wastewater, where the mixing ratio of pretreated mononitrate alkaline red water to TNT acidic wastewater was 1:1.5.

A base of NaOH and trisodium phosphate was added to the equalization tank. After the pH value of wastewater met the conditions of the biochemical filter, the mixed wastewater was pumped into immobilized microorganisms biological filters I-AF and/or I-BAF. The I-AF was an anaerobic filter while the I-BAF was a biological aerated filter. Both filters had a water inflow of 125 L/h.

The wastewater was fed into an eight stage I-AF/I-BAF, where the temperature in the filters was maintained at about 15-35° C. The resulting filtered water from the biochemical filter was fed into a post-treatment container(s) 132 such as an oxidation micro-electrolysis cell.

Concentrated sulfuric acid was added drop wise after dilution at the entrance of the oxidation micro-electrolysis cell, and the pH value of the filtered water was adjusted to about 3.5-5. A solution of 30% hydrogen peroxide was added at the exit of the micro-electrolysis cell with an amount of 5 L per ton of water. The water obtained from the oxidation micro-electrolysis cell was fed into a reaction-coagulation tank.

After the wastewater entered the reaction-coagulation tank, a reaction was carried out between hydrogen peroxide and wastewater in the reaction tank. An aeration lube was provided at a bottom of the reaction tank. A base was added at the water outlet of the tank to facilitate neutralization. Yielding water had its pH controlled within about 7~9.

Water obtained from neutralization in the reaction of the reaction-coagulation tank was fed into a coagulation segment. A solution including 0.3% PAM was added in the coagulation segment. An aeration system was provided at a bottom of the coagulation segment for stirring. Water yielding from the reaction-coagulation tank was fed into a secondary sedimentation tank. Settled water was fed into a detector cell.

In this example, a summary of testing results of nitro compounds, phenyl amines and other indicators was:

| Testing | | Testing Results | | |
| --- | --- | --- | --- | --- |
| Position | Testing Items | Test 1 | Test 2 | Test 3 |
| Untreated Water (Red Water) | Nitride (mg/L) | 897.50 | 732.50 | 637.50 |
| | Phenylamine (mg/L) | 0.00 | 0.00 | 0.00 |
| Regulating Reservoir | Nitride (mg/L) | 0.00 | 49.00 | 8.50 |
| | Phenylamine (mg/L) | 18.50 | 5.00 | 80.00 |
| Regulating Equalization Tank | Nitride (mg/L) | 31.00 | 0.00 | 46.50 |
| | Phenylamine (mg/L) | 2.50 | 28.00 | 6.50 |
| Total Yielding Water of System | Nitride (mg/L) | 0.05 | 0.00 | 0.00 |
| | Phenylamine (mg/L) | 0.15 | 0.50 | 0.25 |
| | pH | 8.81 | 9.33 | 8.52 |

-continued

| Testing Position | Testing Items | Testing Results | | |
|---|---|---|---|---|
| | | Test 1 | Test 2 | Test 3 |
| | Chroma | 15~20 | 15 | 20 |
| | SS (mg/L) | 19.5 | 10.0 | 13.0 |

A summary of CODcr testing results in the example was:

Unit: mg/L

| Testing Items | Testing Position | Testing Results | | |
|---|---|---|---|---|
| | | Test 1 | Test 2 | Test 3 |
| CODcr | Untreated Water (Red Water) | $3.28 \times 10^4$ | $2.78 \times 10^4$ | $3.25 \times 10^4$ |
| | Regulating Reservoir | $1.38 \times 10^3$ | $1.17 \times 10^3$ | $1.22 \times 10^3$ |
| | Equalization Tank | $1.50 \times 10^3$ | $1.74 \times 10^3$ | $1.91 \times 10^3$ |
| | Total Yielding Water of System | 60.0 | 32.0 | 19.6 |

Figure 3:
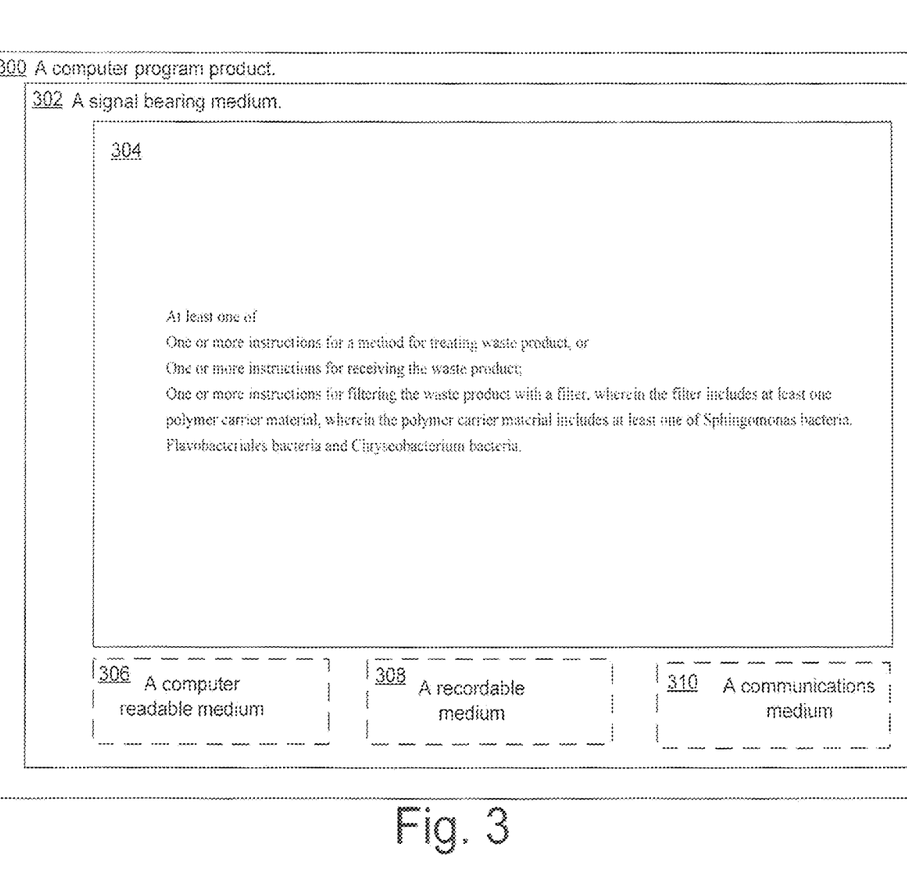
FIG. 3 illustrates a computer program product that can be utilized to treat a waste product.

FIG. 3 illustrates a computer program product that can be utilized to treat waste product arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1 and 2. Thus, for example, referring to system 100, processor 156 may undertake one or more of the blocks shown in FIG. 3 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 4:
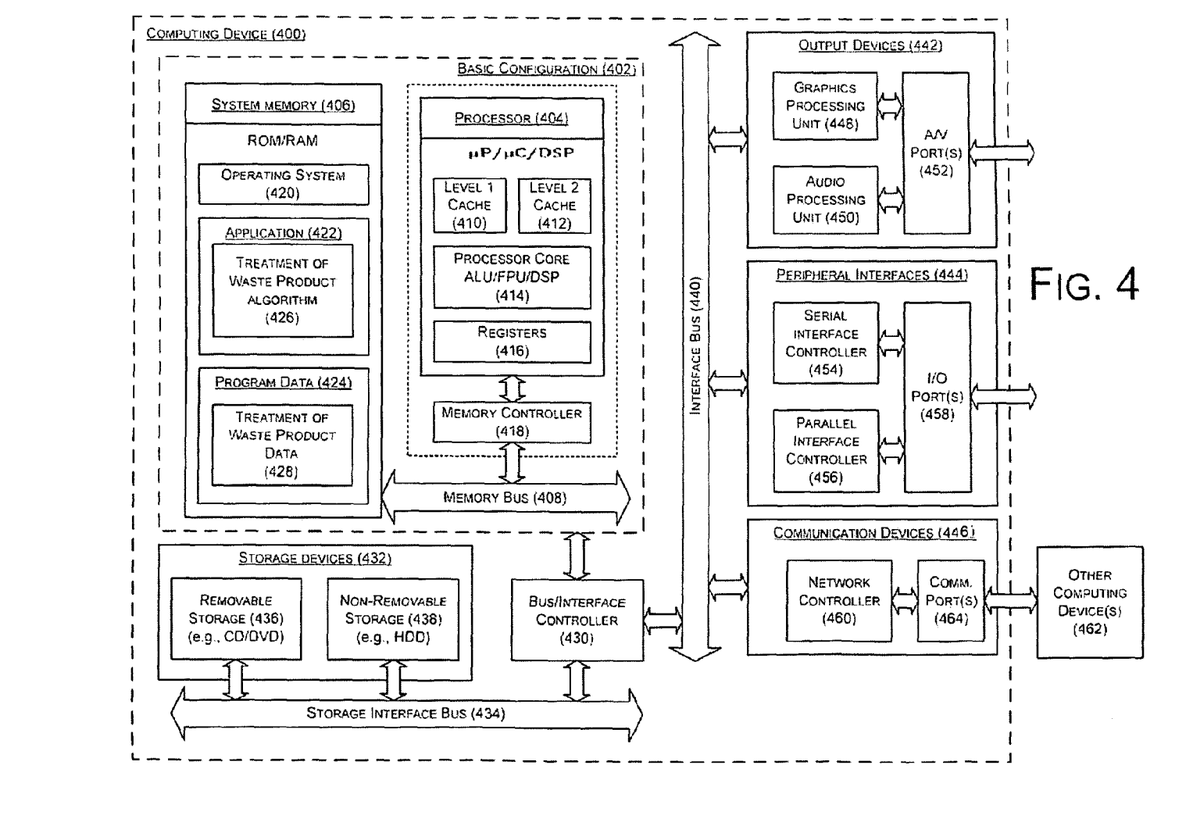
FIG. 4 is a block diagram illustrating an example computing device that is arranged to treat a waste product; all arranged according to at least some embodiments described herein.

FIG. 4 is a block diagram illustrating an example computing device that is arranged to implement treatment of waste product arranged according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a treatment of waste product algorithm 426 that is arranged to perform the functions as described herein including those described with respect to system 100 of FIG. 1. Program data 424 may include treatment of waste product data 428 that may be useful for treating waste product as is described herein. In some embodiments, application 422 may be arranged to operate with program data 424 on operating system 420 such that treating waste product may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer con figurations.

The present disclosure may not be limited in terms of the particular embodiments described in this application, that may be intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations may be intended to fall within the scope of the appended claims. The present disclosure may not be limited only by the terms of the appended claims, along with the full scope of equivalents to which such claims may be entitled. It may be understood that this disclosure may not be limited to particular methods, reagents, compounds compositions or biological systems, which can, of course, vary. It may also be understood that the terminology used herein may be for the purpose of describing particular embodiments only, and may not be intended to be limiting.

With respect to the use of substantially any plural and/or singular terms herein, those having skill in the art can translate from the plural to the singular and/or from the singular to the plural as may be appropriate to the context and/or application. The various singular/plural permutations may be expressly set forth herein for sake of clarity.

It will be understood by those within the art that, in general, terms used herein, and especially in the appended claims (e.g., bodies of the appended claims) may be generally intended as "open" terms (e.g., the term "including" should be interpreted as "including but not limited to," the term "having" should be interpreted as "having at least," the term "includes" should be interpreted as "includes but may not be limited to," etc.). It will be further understood by those within the art that if a specific number of an introduced claim recitation may be intended, such an intent will be explicitly recited in the claim, and in the absence of such recitation no such intent may be present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation may be explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." may be used, in general such a construction may be intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." may be used, in general such a construction may be intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure may be described in terms of Markush groups, those skilled in the art will recognize that the disclosure may be also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein may be for purposes of illustration and should not be seen to be limiting, with the true scope and spirit being indicated by the following claims.

What is claimed is:

1. A treatment system comprising:
a pretreatment system configured to receive wastewater, the wastewater including a waste product, the waste product including nitro compounds including trinitrotoluene (TNT), the pretreatment system comprising:
a micro-electrolysis tank configured to receive the wastewater and to convert the nitro compounds in the waste product into aniline compounds to produce micro-electrolyzed wastewater;
an equalization tank configured to receive the micro-electrolyzed wastewater from the micro-electrolysis tank and to adjust a pH value of the micro-electrolyzed wastewater, wherein the equalization tank converts ferric ions and ferrous ions into ferric hydroxide and ferrous hydroxide respectively and produce equalized wastewater; and
a sedimentation tank configured to receive the equalized wastewater and precipitate the ferric hydroxide and the ferrous hydroxide to produce pretreated wastewater;
a container configured to receive the pretreated wastewater;
a first filter in communication with the container, wherein the first filter includes a first polymer carrier material, and wherein the first polymer carrier material includes *Sphingomonas* sp. in the first polymer material; and
a second filter in communication with the first filter, wherein the second filter includes a second polymer carrier material, and wherein the second polymer carrier material includes *Flavobacteriales* sp. in the second polymer material.

2. The treatment system of claim 1, wherein:
the first filter is at least one of an immobilized microorganisms anaerobic filter or an immobilized microorganisms biological aerated filter;
the second filter is at least one of an immobilized microorganisms anaerobic filter or an immobilized microorganisms biological aerated filter; and
the first and second polymer carrier material is a polyurethane foam carrier.

3. The treatment system of claim 1, wherein:
the first filter comprises a three level immobilized microorganisms anaerobic filter; and
the second filter comprises a five level immobilized microorganisms biological aerated filter.

4. The treatment system of claim 1, wherein:
the first filter comprises an immobilized microorganisms anaerobic filter that includes *Pseudomonas* sp. and *Sphingomonas* sp. in the first polymer carrier material, and
the second filter comprises an immobilized microorganisms biological aerated filter that includes *Flavobacteriales* sp. and *Chryseobacterium* sp. in the second polymer carrier material.

5. The treatment system of claim 1, wherein the equalization tank is configured to receive and adjust a pH of the waste product to from about 6 to about 9 and the settlement tank is configured to remove suspended substances from the waste product.

6. The treatment system of claim 1, wherein the equalization tank is configured to add NaOH and trisodium phosphate to the micro-electrolyzed wastewater.

7. The treatment system of claim 1, wherein the waste product comprises organic wastewater from the production of trinitrotoluene.

8. The treatment system of claim 7, wherein the organic wastewater from the production of trinitrotoluene includes at least one of dinitro-toluene (DNT), 2-nitrotoluene (MNT), a nitrobenzene and a phenyl amine.

9. A method for treating waste product, the method comprising:
receiving wastewater, the wastewater including a waste product, the waste product including nitro compounds including trinitrotoluene (TNT);
micro-electrolyzing the wastewater to convert the nitro compounds in the waste product into aniline compounds and produce micro-electrolyzed wastewater;
equalizing the micro-electrolyzed wastewater to adjust a pH value of the micro-electrolyzed wastewater, wherein the equalization converts ferric ions and ferrous ions into ferric hydroxide and ferrous hydroxide respectively to produce equalized wastewater; and
sedimenting the equalized wastewater to precipitate the ferric hydroxide and the ferrous hydroxide to produce pretreated wastewater;
filtering the pretreated wastewater through a first filter to produce filtered waste product; and
filtering the filtered waste product through a second filter; wherein
the first filter includes a first polymer carrier material, and wherein the first polymer carrier material includes *Sphingomonas* sp. in the first polymer material; and
the second filter includes a second polymer carrier material, and wherein the second polymer carrier material includes *Flavobacteriales* sp. in the second polymer material.

10. The method of claim 9, wherein:
the first filter is an immobilized microorganisms anaerobic filter including the *Pseudomonas* sp. bacteria and *Sphingomonas* sp. bacteria; and
wherein the second filter is an immobilized microorganisms biological aerated filter including the *Flavobacteriales* bacteria and the *Chryseobacterium* bacteria.

11. The method of claim 9, wherein the first filter further comprises Raoultella *terrigena* sp.

12. The method of claim 9, wherein the equalization tank is configured to receive and adjust a pH of the micro-electrolyzed wastewater to from about 6 to about 9 and the settlement tank is configured to remove suspended substances from the equalized wastewater.

13. The method of claim 9, wherein the waste product comprises organic wastewater from the production of trinitrotoluene.

14. The method of claim 13, wherein the organic wastewater comprises at least one of dinitro-toluene (DNT), 2-nitrotoluene (MNT), a nitrobenzene and a phenyl amine.

15. A pre-treatment system comprising:
a micro-electrolysis tank configured to receive wastewater, the wastewater including a waste product, the waste product including nitro compounds including trinitrotoluene (TNT), the micro-electrolysis tank further configured to convert the nitro compounds in the waste product into aniline compounds to produce micro-electrolyzed wastewater;
an equalization tank configured to receive the micro-electrolyzed wastewater from the micro-electrolysis tank and to adjust a pH value of the micro-electrolyzed wastewater, wherein the equalization tank converts ferric ions and ferrous ions into ferric hydroxide and ferrous hydroxide respectively to produce equalized wastewater; and a sedimentation tank configured to receive the equalized wastewater and precipitate the ferric hydroxide and the ferrous hydroxide to produce pretreated wastewater.

16. The pre-treatment system of claim 15, wherein the equalization tank is configured to receive and adjust a pH of the micro-electrolyzed wastewater to from about 6 to about 9 and the settlement tank is configured to remove suspended substances from the equalized wastewater.

17. The pre-treatment system of claim 15, wherein the equalization tank is configured to add NaOH and trisodium phosphate to the micro-electrolyzed wastewater.

* * * * *